United States Patent
Kasamsetty et al.

(10) Patent No.: US 6,877,014 B1
(45) Date of Patent: Apr. 5, 2005

(54) METHOD AND APPARATUS TO FACILITATE TRANSACTIONAL CONSISTENCY FOR REFERENCES IN OBJECT-RELATIONAL DATABASES

(75) Inventors: Ravikanth Kasamsetty, Redwood City, CA (US); Srinath Krishnaswamy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 486 days.

(21) Appl. No.: 10/060,476

(22) Filed: Jan. 30, 2002

(51) Int. Cl.⁷ ............................................. G06F 17/30
(52) U.S. Cl. ........................... 707/103 R; 707/103 Y; 707/103; 707/201; 707/203
(58) Field of Search ..................... 707/103 R, 103 Y, 707/103, 201, 203

(56) References Cited

U.S. PATENT DOCUMENTS

| | | | | |
|---|---|---|---|---|
| 6,163,776 A | * | 12/2000 | Periwal | 707/4 |
| 6,192,370 B1 | * | 2/2001 | Primsch | 707/103 R |
| 6,240,413 B1 | * | 5/2001 | Learmont | 707/8 |
| 6,611,751 B2 | * | 8/2003 | Warren | 701/200 |
| 2001/0051949 A1 | * | 12/2001 | Carey et al. | 707/103 R |
| 2002/0194287 A1 | * | 12/2002 | Tyra et al. | 709/206 |
| 2003/0014421 A1 | * | 1/2003 | Jung | 707/102 |

\* cited by examiner

*Primary Examiner*—Luke S Wassum
*Assistant Examiner*—Kuen S. Lu
(74) *Attorney, Agent, or Firm*—Park, Vaughan & Fleming LLP

(57) ABSTRACT

One embodiment of the present invention provides a system that facilitates transactional consistency for references in an object-relational database. The system operates by first receiving a reference to an object located in the object-relational database. Next, the system creates a reference object within local storage that includes an object descriptor to indicate whether the object has been loaded into local storage. The reference is stored in this reference object. A pointer within an application program can then point to the reference object, so that the application program can use the pointer to access the object.

18 Claims, 4 Drawing Sheets

METHOD AND APPARATUS TO FACILITATE TRANSACTIONAL CONSISTENCY FOR REFERENCES IN OBJECT-RELATIONAL DATABASES

BACKGROUND

1. Field of the Invention

The present invention relates to object-relational databases. More specifically, the present invention relates to a method and an apparatus to facilitate transactional consistency for references in object-relational databases.

2. Related Art

Object-relational databases typically support navigational accesses that allow object-oriented programs to access objects within the database. During a navigational access, applications process objects by following a reference to an initial set of objects, and then use references within these initial objects to traverse the remaining objects.

Typically, an object-oriented application using navigational access first retrieves one or more objects from a database server, possibly by issuing a structured query language (SQL) statement, which returns references to these objects. The application then pins these objects and navigates from them to other objects by following the references. Pinning the object involves transferring a copy of the object to a local data structure, and locking the object within the database so that other applications cannot change the data until the object is unpinned using either a commit or abort operation. After a commit or abort operation, the reference is considered to be undefined, therefore the reference must be pinned again before operations can resume on the object.

While an object is pinned, it is common for many references to be established to that object. After an abort or a commit, each of these references are typically invalidated and must be individually reestablished before subsequent operations can resume on the object. While this method ensures integrity of the object, it is inefficient, wastes computing resources, and reduces system throughput. Since it is common to pin an object, make changes to the object, commit the changes, and then make additional changes to the same object, these references are being continually established and destroyed.

What is needed is a method and an apparatus to facilitate transactional consistency for references to object-relational databases without the problems described above.

SUMMARY

One embodiment of the present invention provides a system that facilitates transactional consistency for references in an object-relational database. The system operates by first receiving a reference to an object located in the object-relational database. Next, the system creates a reference object within local storage that includes an object descriptor to indicate whether the object has been loaded into local storage. The reference is stored in this reference object. A pointer within an application program can then point to the reference object, so that the application program can use the pointer to access the object.

In one embodiment of the present invention, the system loads the object into local storage from the object-relational database and sets the object descriptor within the reference object to indicate that the object is in local storage.

In one embodiment of the present invention, the system assigns additional pointers within the application program to point to the reference object. These additional pointers can be used to access the object in local storage when the object descriptor is set.

In one embodiment of the present invention, the system clears the object descriptor when a transaction involving the object is committed to indicate that the object is not in local storage, so that the application program does not need to invalidate pointers to the reference object.

In one embodiment of the present invention, when the application program accesses the reference object while the object descriptor is cleared, the system loads the object into local storage and sets the object descriptor to indicate that the object is located in local storage. Setting the object descriptor indicates that pointers within the application program that currently point to the reference object are valid.

In one embodiment of the present invention, transaction semantics for the application program are not changed to use the reference object.

In one embodiment of the present invention, a dereferencing operator is overloaded to include operations involving the reference object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing systems

Figure 1:
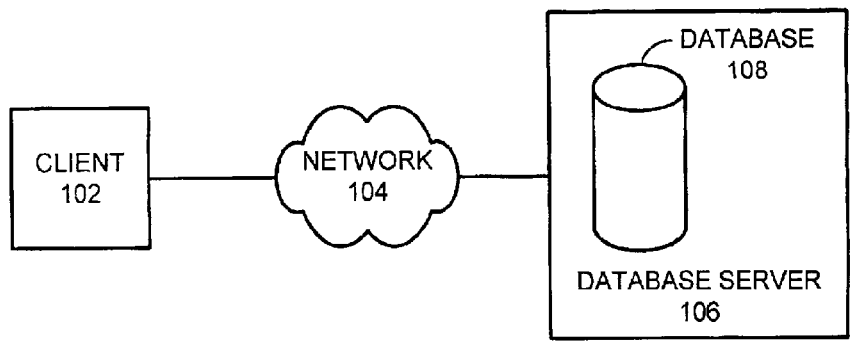
FIG. 1 illustrates computing systems coupled together in accordance with an embodiment of the present invention.

FIG. 1 illustrates computing systems coupled together in accordance with an embodiment of the present invention. The system includes client 102 and database server 106. Client 102 and database server 106 can generally include any type of computer system, including, but not limited to, a computer system based on a microprocessor, a mainframe computer, a digital signal processor, a portable computing device, a personal organizer, a device controller, and a computational engine within an appliance. Database server 106 can generally include any computational node including a mechanism for servicing requests from a client for computational and/or data storage resources.

Client 102 and database server 106 are coupled together across network 104. Network 104 can generally include any type of wire or wireless communication channel capable of coupling together computing nodes. This includes, but is not limited to, a local area network, a wide area network, or a combination of networks. In one embodiment of the present invention, network 104 includes the Internet.

Database server 106 includes database 108. Database 108 can include any type of system for storing data in nonvolatile storage. This includes, but is not limited to, systems based upon magnetic, optical, and magneto-optical storage devices, as well as storage devices based on flash memory and/or batterybacked up memory. Database 108 provides persistent storage of objects for client 102. During operation, applications within client 102 typically retrieve objects from database 108 across network 104, update data within these objects, and commit the updates to database 108.

Client 102

Figure 2:
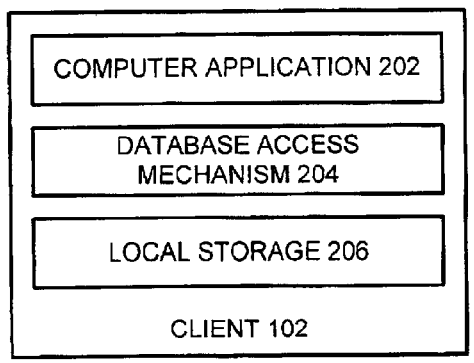
FIG. 2 illustrates client 102 in accordance with an embodiment of the present invention.

FIG. 2 illustrates client 102 in accordance with an embodiment of the present invention. Client 102 includes computer application 202, database access mechanism 204, and local storage 206. Computer application 202 includes computer instructions that can be used to update and store information within database 108. Note that client 102 can include multiple computer applications, which may access database 108.

Database access mechanism 204 interfaces client 102 to database server 106 across network 104 to store and retrieve data located in database 108. Database access mechanism 204 can include a structured query language (SQL) interface mechanism or a java database connectivity (JDBC) interface mechanism. SQL and JDBC mechanisms are well understood in the art and will not be described further herein. The terms JAVA, JVM and JAVA VIRTUAL MACHINE are trademarks of SUN Microsystems, Inc. of Palo Alto, Calif.

Local storage 206 provides storage and access to objects that have been pinned by computer application 202 and for reference objects used to access these pinned objects. Local storage 206 and the operations involving data stored within local storage 206 are discussed in detail in conjunction with FIGS. 3 through 7 below.

Data Object in Local Storage

Figure 3:
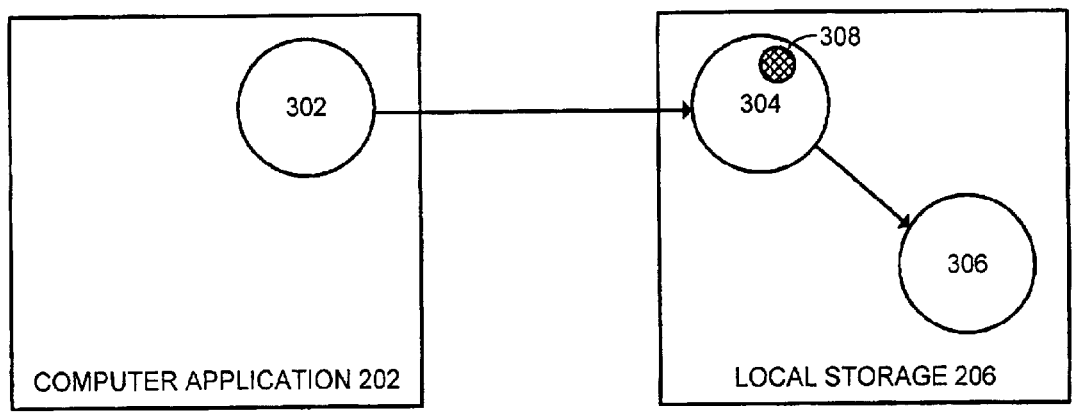
FIG. 3 illustrates a data object in local storage in accordance with an embodiment of the present invention.

FIG. 3 illustrates a data object in local storage in accordance with an embodiment of the present invention. In operation, computer application 202 accesses database 108 using database access mechanism 204. Initially, client 102 receives a reference to an object typically by using a query such as "SELECT REF(person) FROM PERSON_TAB person where NAME='Joe'". This query returns a reference to the object within table PERSON_TAB with the name Joe. Upon receiving this reference, database access mechanism 204 creates reference object 304 and stores the reference within reference object 304. Initially, object descriptor 308 is cleared to indicate that the object is not in local storage. Database access mechanism then returns pointer 302 to computer application 202, which points to reference object 304.

When computer application 202 dereferences pointer 302, database access mechanism 204 uses the reference in reference object 304 to retrieve the object from database 108 and stores the object as object 306 within local storage 206. Reference object 304 is updated to point to object 306 and object descriptor 308 is set as shown in FIG. 3 to indicate that object 306 is in local storage.

Multiple Accesses

Figure 4A:
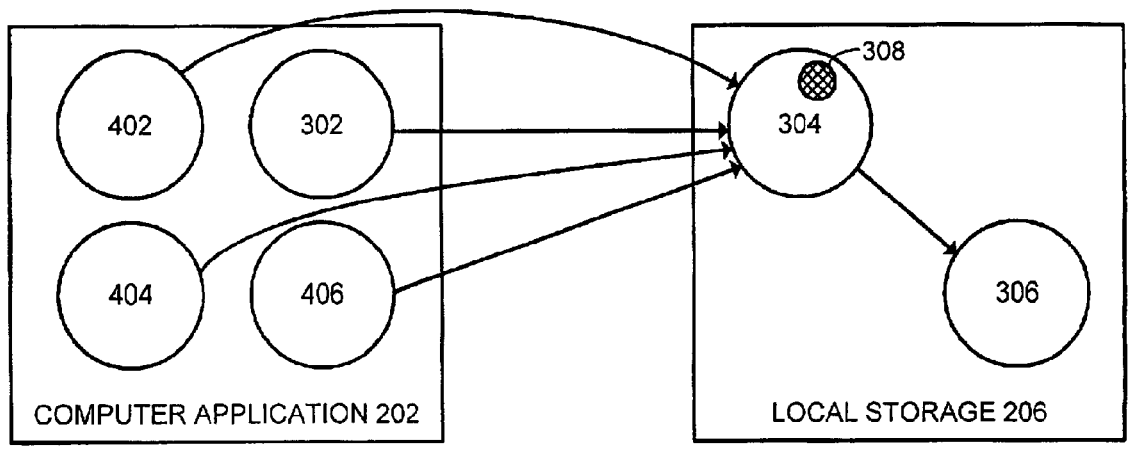
FIG. 4A illustrates multiple accesses to an object currently in local storage in accordance with an embodiment of the present invention.

FIG. 4A illustrates multiple accesses to an object currently in local storage in accordance with an embodiment of the present invention. During operation, computer application 202 can create multiple references to object 306. Database access mechanism 204 causes each of these references to be directed to object descriptor 308 so that computer application 202 can access the elements of object 306. These multiple references are illustrated by pointers 402, 404, and 406 in FIGS. 4A and 4B. When object descriptor 308 is set, pointers 302, 402, 404, and 406 can access object 306 from local storage 206 and receive the latest data from object 306.

Figure 4B:
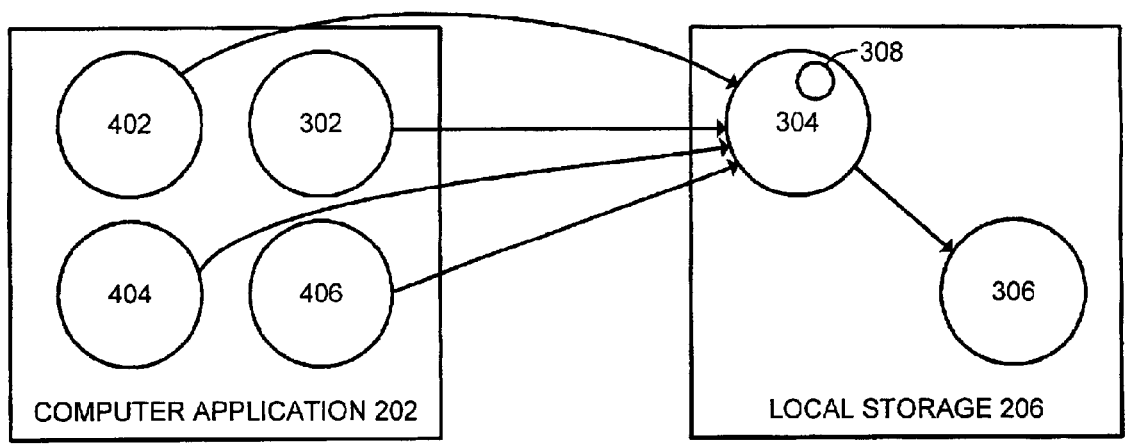
FIG. 4B illustrates multiple accesses to an object that is not currently in local storage in accordance with an embodiment of the present invention.

FIG. 4B illustrates multiple accesses to an object that is not currently in local storage in accordance with an embodiment of the present invention. When an operation on object 306 is committed to database 108 or aborted, object descriptor 308 is cleared to indicate that the latest version of object 306 is not in local storage. Note that pointers 302, 402, 404, and 406 have not been invalidated and still point to reference object 304. When computer application 202 attempts to access object 306 using any of pointers 302, 402, 404, or 406, database access mechanism 204 can examine object descriptor 308 and determine local storage 206 does not include the most current version of object 306. Database access mechanism 204 can then reload object 306 from database 108.

Creating a Reference Object

Figure 5:
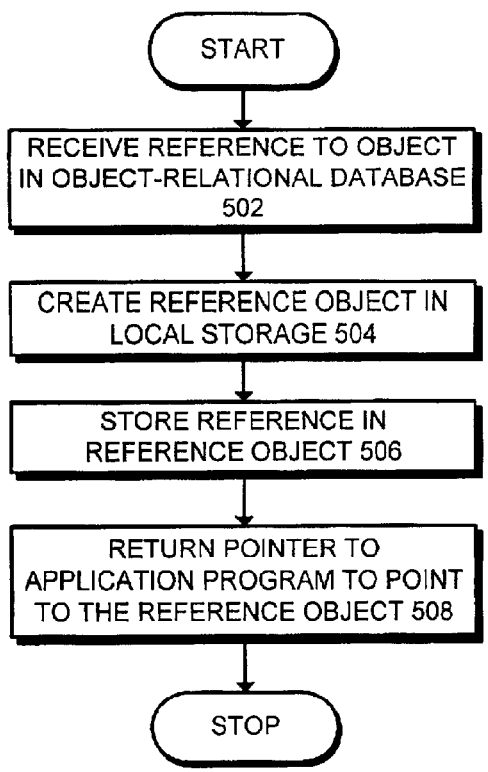
FIG. 5 is a flowchart illustrating the process of creating a reference object in accordance with an embodiment of the present invention.

FIG. 5 is a flowchart illustrating the process of creating a reference object in accordance with an embodiment of the present invention. The system starts when computer application 202 attempts to access database 108 and database access mechanism 204 receives a reference to an object in object-relational database 108 (step 502). Next, database access mechanism 204 creates reference object 304 within local storage 206 (step 504).

After creating reference object 304, database access mechanism 204 stores the reference to the object in reference object 304 (step 506). Note that object descriptor 308 is initially cleared because the object is not located in local storage 206. Finally, database access mechanism 204 returns pointer 302 to computer application 202 so that computer application 202 can access the object (step 508).

Dereferencing a Reference Request

Figure 6:
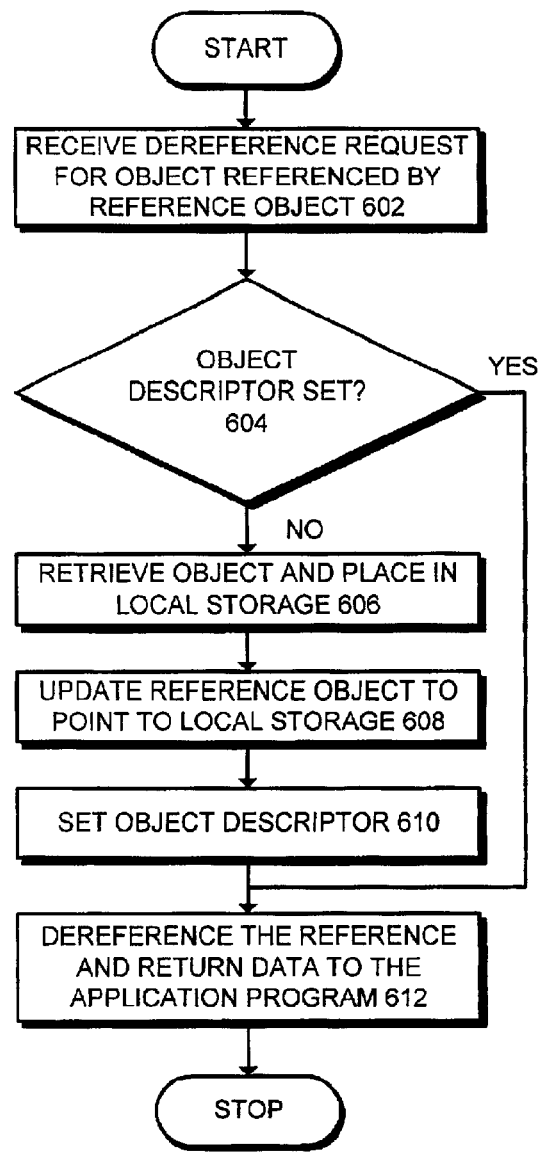
FIG. 6 is a flowchart illustrating the process of dereferencing a reference request in accordance with an embodiment of the present invention.

FIG. 6 is a flowchart illustrating the process of dereferencing a reference request in accordance with an embodiment of the present invention. The system starts when database access mechanism 204 receives a request from computer application 202 to dereference a pointer, say pointer 302 (step 602). Next, database access mechanism 204 determines if object descriptor 308 is set (step 604). If object descriptor 308 is not set, database access mechanism 204 retrieves the object and places the object in local storage 206 as object 306 (step 606).

After object 306 has been placed in local storage, database access mechanism 204 updates reference object 304 to point to object 306 in local storage 206 (step 608). Next, database access mechanism 204 sets object descriptor 308 to indicate that object 306 is in local storage 206 (step 610). After updating object descriptor 308 in step 610 or if object descriptor 308 is set at step 604, database access mechanism 204 dereferences the reference within reference object 304 and returns the requested data to computer application 202 (step 612).

Committing or Aborting a Transaction

Figure 7:
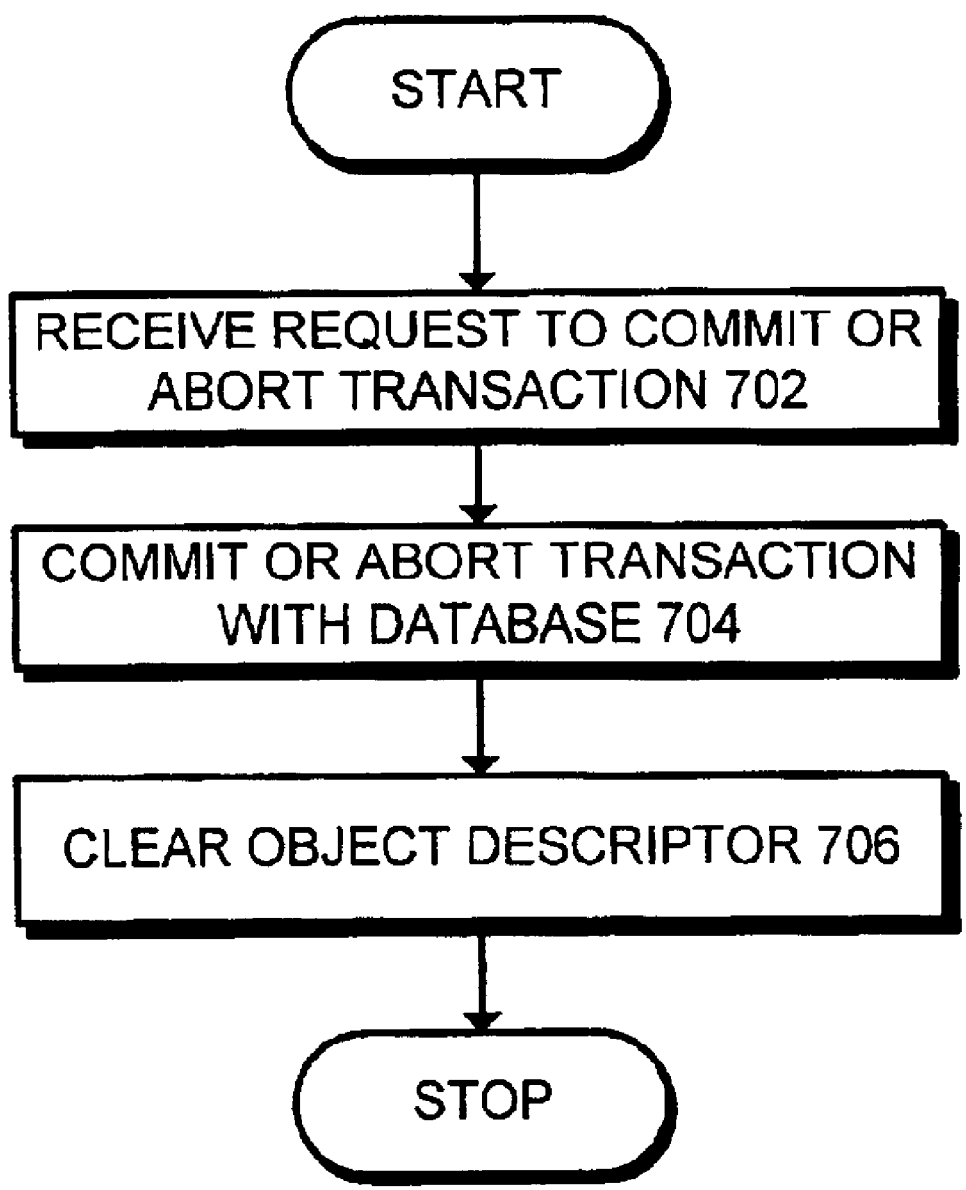
FIG. 7 is a flowchart illustrating the process of committing or aborting a transaction in accordance with an embodiment of the present invention.

FIG. 7 is a flowchart illustrating the process of committing or aborting a transaction in accordance with an embodiment of the present invention. The process starts when database access mechanism 204 receives a request from computer application 202 to commit or abort a transaction (step 702). Next, database access mechanism 204 commits the transaction to database server 106 or aborts the transaction with database server 106 (step 704). Note that committing or aborting the transaction can allow other applications to pin the object. Finally, database access mechanism 204 clears object descriptor 308 to indicate that the object is not currently located in local storage 206 (step 706). The references in computer application 202 that point to reference object 304, however, remain valid.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate transactional consistency for references in an object-relational database, comprising:
receiving a reference to an object located in the object-relational database;
creating a reference object within local storage, wherein the reference object includes an object descriptor that indicates whether the object has been loaded into local storage;
storing the reference in the reference object;
during execution of an application program, assigning a pointer to point to the reference object, whereby the application program can use the pointer to access the object; and
when the application program dereferences the pointer to access the object, the method further comprises:
loading the object into local storage from the object-relational database, and
setting the object descriptor within the reference object to indicate that the object is in local storage;
wherein the object descriptor allows references to the reference object to remain active when the object is not in local storage.

2. The method of claim 1, further comprising assigning an additional pointer within the application program to point to the reference object, wherein the additional pointer can be used to access the object in local storage when the object descriptor is set.

3. The method of claim 2, further comprising clearing the object descriptor when a transaction involving the object is committed to indicate that the object is not in local storage, whereby the application program does not need to invalidate pointers to the reference object.

4. The method of claim 3, wherein when the application program accesses the reference object when the object descriptor is cleared, the method further comprises:
loading the object into local storage; and
setting the object descriptor to indicate that the object is located in local storage, whereby pointers within the application program currently pointing to the reference object are valid.

5. The method of claim 4, wherein transaction semantics for the application program are not changed to use the reference object.

6. The method of claim 4, wherein a dereferencing operator is overloaded to include operations involving the reference object.

7. A computer-readable storage medium storing instructions that when executed by a computer cause the computer to perform a method to facilitate transactional consistency for references in an object-relational database, the method comprising:
receiving a reference to an object located in the object-relational database;
creating a reference object within local storage, wherein the reference object includes an object descriptor that indicates whether the object has been loaded into local storage;
storing the reference in the reference object;
during execution of an application program, assigning a pointer to point to the reference object, whereby the application program can use the pointer to access the object; and
when the application program dereferences the pointer to access the object, the method further comprises:
loading the object into local storage from the object-relational database, and
setting the object descriptor within the reference object to indicate that the object is in local storage;
wherein the object descriptor allows references to the reference object to remain active when the object is not in local storage.

8. The computer-readable storage medium of claim 7, the method further comprising assigning an additional pointer within the application program to point to the reference object, wherein the additional pointer can be used to access the object in local storage when the object descriptor is set.

9. The computer-readable storage medium of claim 8, the method further comprising clearing the object descriptor when a transaction involving the object is committed to indicate that the object is not in local storage, whereby the application program does not need to invalidate pointers to the reference object.

10. The computer-readable storage medium of claim 9, wherein when the application program accesses the reference object when the object descriptor is cleared, the method further comprises:
loading the object into local storage; and
setting the object descriptor to indicate that the object is located in local storage, whereby pointers within the application program currently pointing to the reference object are valid.

11. The computer-readable storage medium of claim 10, wherein transaction semantics for the application program are not changed to use the reference object.

12. The computer-readable storage medium of claim 10, wherein a dereferencing operator is overloaded to include operations involving the reference object.

13. An apparatus to facilitate transactional consistency for references in an object-relational database, comprising:
- a receiving mechanism that is configured to receive a reference to an object located in the object-relational database;
- a creating mechanism that is configured to create a reference object within local storage, wherein the reference object includes an object descriptor that indicates whether the object has been loaded into local storage;
- a storing mechanism that is configured to store the reference in the reference object;
- an assigning mechanism that is configured to assign a pointer within an application program to point to the reference object, whereby the application program can use the pointer to access the object; and
- a loading mechanism that is configured to load the object into local storage from the object-relational database; and
- a setting mechanism that is configured to set the object descriptor within the reference object to indicate that the object is in local storage;
- wherein the object descriptor allows references to the reference object to remain active when the object is not in local storage.

14. The apparatus of claim 13, wherein the assigning mechanism is further configured to assign an additional pointer within the application program to point to the reference object, wherein the additional pointer can be used to access the object in local storage when the object descriptor is set.

15. The apparatus of claim 14, further comprising a clearing mechanism that is configured to clear the object descriptor when a transaction involving the object is committed to indicate that the object is not in local storage, whereby the application program does not need to invalidate pointers to the reference object.

16. The apparatus of claim 15,
- wherein the loading mechanism is further configured to load the object into local storage; and
- wherein the setting mechanism is further configured to set the object descriptor to indicate that the object is located in local storage, whereby pointers within the application program currently pointing to the reference object are valid.

17. The apparatus of claim 16, wherein transaction semantics for the application program are not changed to use the reference object.

18. The apparatus of claim 16, wherein a dereferencing operator is overloaded to include operations involving the reference object.

* * * * *